UNITED STATES PATENT OFFICE.

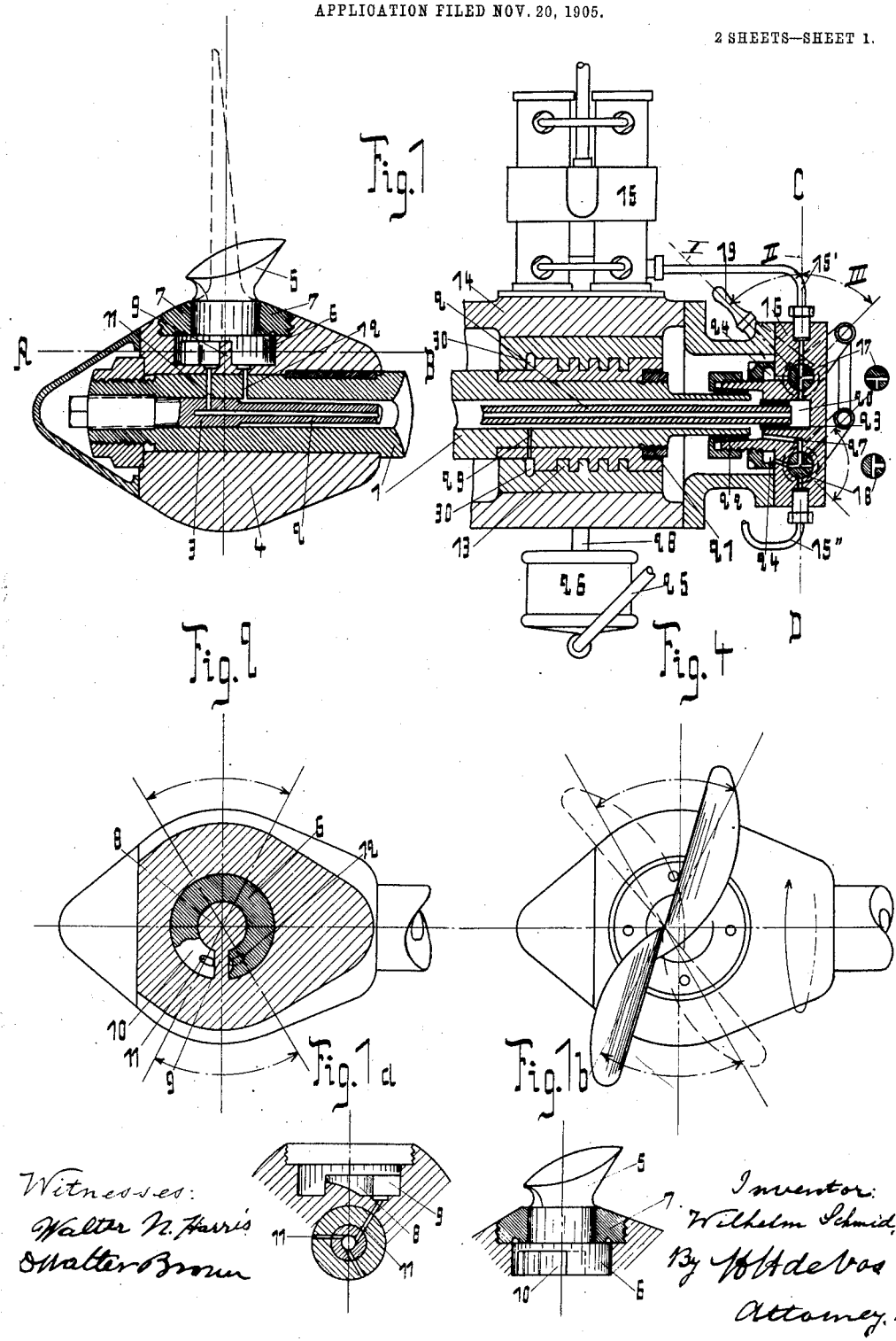

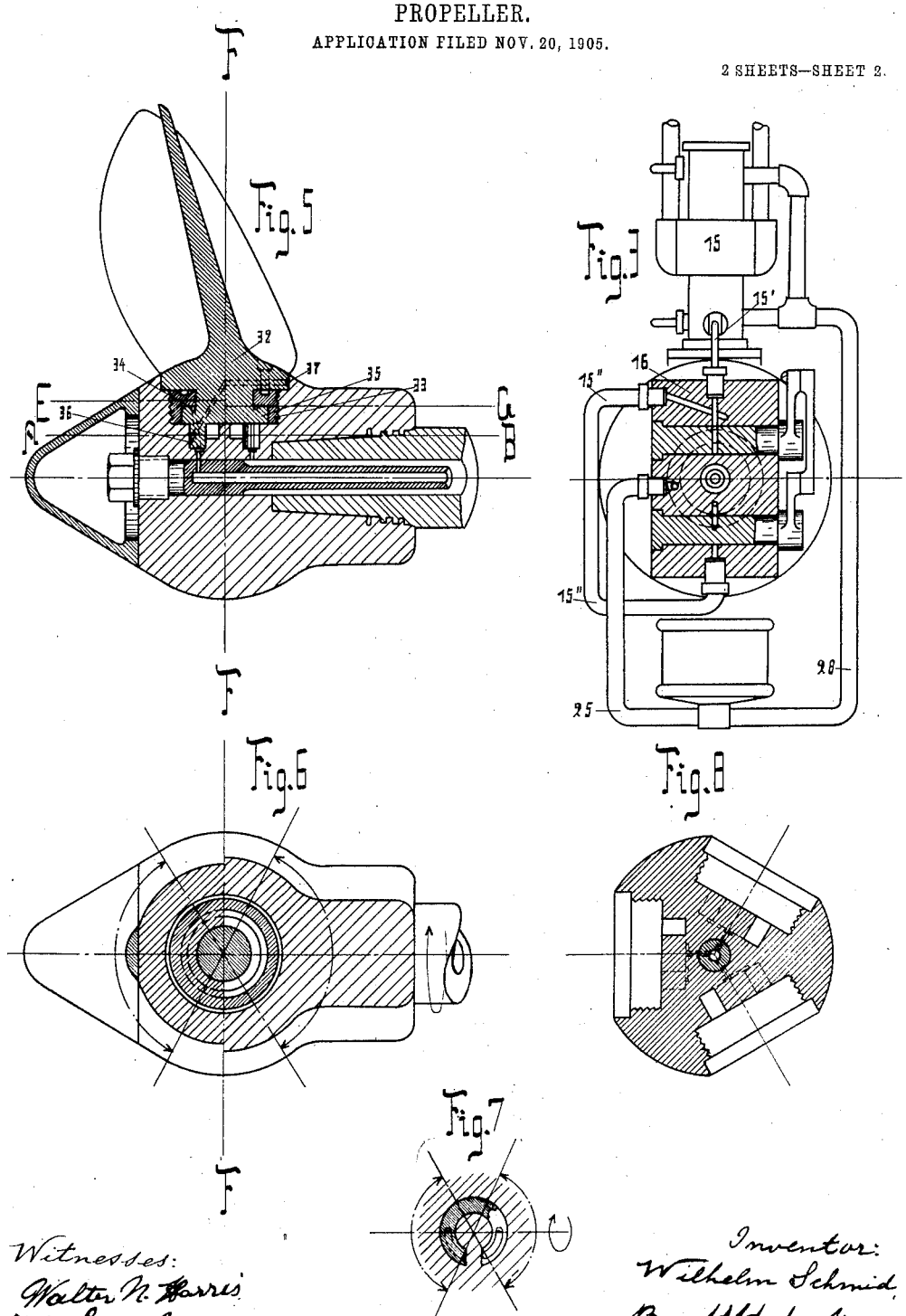

WILHELM SCHMID, OF SCHAFFHAUSEN, SWITZERLAND.

PROPELLER.

No. 853,999.   Specification of Letters Patent.   Patented May 21, 1907.

Application filed November 20, 1905. Serial No. 288,148.

*To all whom it may concern:*

Be it known that I, WILHELM SCHMID, a citizen of the Republic of Switzerland, and a resident of Schaffhausen, Switzerland, have invented a certain new and useful Improvement in Propellers, of which the following is a specification.

The present invention relates to improved means for reversing propeller-blades by fluid under pressure, the fluid being permitted to act on the specially formed roots of the blades, without any intermediate members being interposed.

Two embodiments of the invention are illustrated in the accompanying drawings in which Figure 1 represents a longitudinal section through the two ends of a propeller shaft. Figs. 1$^a$ and 1$^b$ show the form of recesses for, and the shape of the roots of propeller-blades. Fig. 2 is a longitudinal section along the line A—B of Fig. 1 and Fig. 3 a transverse section on the line C—D of Fig. 1. Fig. 4 is a plan of the propeller showing the two-part nut and the angular displacement of propeller-blades. Fig. 5 shows a modification. Fig. 6 a longitudinal section along lines E—F and F—G of Fig. 5. Fig. 7 a longitudinal section on line A—B of Fig. 5.
Fig. 8 a cross section through the center of the hub of Fig. 5.

Referring to the drawings, the propeller-shaft 1 is hollow throughout its entire length and in its bore is inserted a tube 2 closed at its rear extremity 3; its external diameter is less than that of the bore, leaving an annular clearance between them. This annular shaft conduit and the bore of tube 2 form the two principal working conduits for the pressure fluid. This tube 2 is preferably composed of a number of lengths connected by coupling sleeves. The hub 4 is provided with recesses for the reception of the roots forming the pivots 6 of the propeller-blades 5 whose number is arbitrary, preferably three. The pivot of each blade being made to fit exactly in the lower or deeper portion of its recess, forms a collar and shoulder (Figs. 1 and 1$^b$) by which the blade is secured down in its seat by means of the two part nut 7 (Figs. 1 and 4) lodged in the enlarged outer portion of the recess. The bottom faces of the pivots 6 are also provided with recesses 10 shaped as shown in Fig. 1$^b$ and Fig. 2; the angle of the sector-shaped portion corresponds to the required angular displacement of the propeller-blades. The bottom of each hub-recess is provided with a central stud or pin 8 and a partition plate 9 dividing the sector 10 in two separate chambers (Figs. 2 and 7) into one or other of which the pressure medium is admitted to effect the reversal of the propeller-blades in the desired sense, one or other face of the partition-plate 9 serving as an abutment to the pressure. Two borings 11 and 12 (Figs. 1 and 2) open upon the tube 2, boring 11 communicating with the interior of tube 2 and boring 12 with the bore of the shaft 1. In order to allow the face access of the fluid, when the propeller-blades occupy their two extreme or working positions, the limiting faces of the sector are slightly concave.

The forward end of the shaft 1 terminates in the thrust bearing 13, Fig. 1 which is fixed in the turbine casing 14. Upon this latter is mounted the pump 15 by means of which the pressure is imparted to the fluid (preferably oil). The pump may be driven by steam from the ship's boilers. At the front of the turbine-casing 14, and thrust bearing 13 is mounted a cock-casing 16 provided with a pair of three-way cocks 17 and 18. These two cocks are coupled and are actuated by a common operating lever 19. Instead of the three-way cocks, two pairs of valves may preferably be used. The forward extremity of tube 2 enters the central chamber 20 in the cock or valve casing, whereas the fore-end of the shaft (on to which the thrust-bearing 13 is attached by means of the nut 21) is stepped at its extremity and packed in a stuffing box 22 in which it revolves with the shaft. The cocks 17 and 18 communicate with pump 15 through the two connecting pipes 15$^1$ and 15$^{11}$. From cock 17 one passage bored in the cock-casing leads to the central chamber 20 while the second passage opens into the annular exit-chamber 24. From cock 18 one passage 27 communicates with the annular shaft-conduit and the other passage also opens into the annular exit-chamber 24. This latter communicates through the conduit 25, with the reservoir 26 from which the pump itself is fed by the conduit 2. In the plugs of the cocks the transverse passages or borings are arranged relatively to each other in such a manner that when, as shown in Fig. 1, the operating lever 19 is in position 1 and the pressure fluid from the pump passes from the one cock (17) to the central chamber 20, the central tube conduit 2 and consequently through the hub-boring 11 on to one side of the partition plate 9, the other cock 18 establishes communication (for the back-flow) between the opposite side of plate 9, the hub-boring 12, the annular shaft conduit, the passage 27 with the annular exit-chamber 24 and finally with the reservoir 26. When, on the other hand, the operating lever 19 takes the position III, the functions of the two cocks are exchanged, viz: their inlets and outlets for the conduits are inverted.

The simultaneous admission of high-pressure fluid to the one side of the three partition plates 9 and of the three recesses 10 and pivots 6, and the simultaneous discharge of the low presure fluid from the opposite sides of the three partition plates, produces the simultaneous and equi-directed reversal of all the blades in the desired sense. In midway position II of the lever 19 all the supply conduits from the pumps, are obturated by the cocks.

If the blades have such a form that, while exerting their propelling effect, the thrust center of the re-acting water assumes such a position in relation to their pivoted axis as will tend to adjust the blades in the same sense as the pressure fluid does, then the blades after their reversal by the action of the pressure-fluid, will be automatically locked in their new working positions by the thrust of the re-acting water itself, assisted by the friction of the jamming action in the pivots. The further admission of pressure fluid may then be discontinued by shifting the operating lever into its mid position II. The arrangement may, however, also be made in such a manner, that the locking of the blades in their working positions is effected solely by the continual admission of the pressure fluid. By a similar arrangement the blades may be locked in any desired position, such for instance, as to offer the least resistance to the motion of the ship, while the particular propeller and its motor is at rest.

The operation of the apparatus is as follows: When the ship's motion is to be reversed, say from movement ahead to movement astern, the operating lever 19 is brought into position III and the pump is started, either automatically or by hand, whereby the fluid pressure is admitted to the pivots of the blades and their reversal effected in the manner described. If the blades are self-locking, the action of the pump may, after the reversal is completed, be stopped and the lever 19 shifted into its midway position II. If, on the contrary, the blades are not self-locking the lever 19 after the reversal has taken place, is left in position III (for astern movement) and the pump is kept working. For going ahead again the operating lever is put into position I and after completion of the reversal either stopped or kept working, according to whether the blades are self-locking or not. When operating in the manner just described, the reversal in each sense is performed against the full force of the re-acting water and under the consequent jamming action and friction in the pivots of the blades. In order to avoid such friction during the act of reversal this latter may preferably be initiated by reducing for a short time the speed of revolution of the propeller and motor, whereby the blades are relieved from their propelling thrust and from consequent friction in the pivots. The fluid pressure required to turn the blades will be considerably reduced. After reversal the propeller may assume its normal speed again.

Figs. 5 and 6 represent a modified form of the blades and their pivots, providing a more convenient shape of their roots and improved means for relieving the various pivot surfaces from undue pressure during reversal without having recourse to a temporary reduction of the speed of the propeller. The annular contact surface between the shoulder 35 of the pivot and the bi-partite nut 33 contains an annular relieving groove 34 to which the fluid pressure has access in order to balance both the fluid pressure against the inward face of the pivot and the centrifugal force of the blade. At suitable points of the cylindrical surfaces of the pivot and its seat relieving grooves 36 and 37 are also provided, to which fluid pressure is admitted so as to counteract the jamming action of the propeller-thrust during reversal.

The relief of the thrust bearing of turbine driven propellers, when going ahead, is generally effected by arranging the turbine in such a manner, that its axially directed steam pressure counterbalances the thrust of the propeller-shaft. With the propeller above described the thrust-bearing may also be relieved, during movement astern, by admitting pressure fluid from the annular shaft-conduit (then in communication with the pump and under high pressure) into the annular space 30 (Fig. 1) of the thrust-bearing:

Having now described my invention what I claim and desire to secure by Letters Patent of the United States is:—

1. In a propeller, the combination with a hub and blades adjustably mounted thereon, said hub and blades having inter-communicating internal recesses, of fixed plates dividing the recesses in the blades into compartments, a longitudinally hollowed shaft having lateral passages communicating respectively with the aforesaid compartments, a tube within said shaft communicating with one of said passages, a pump for supplying pressure fluid, and three-way cocks for selectively directing said fluid as desired to one or other of said passages.

2. In a propeller, the combination of a plurality of adjustable blades each having at its root an internal cavity divided into two compartments, a hub carrying said blades and having passages communicating with all the said compartments, a hollow shaft carrying said hub and having passages communicating with the passages in the hub for directing a pressure medium selectively to one of the two compartments in each blade, and means for supplying said pressure medium.

3. In a propeller, the combination of a hub, pivotal blades carried thereby, each having a plurality of internal compartments, two pressure fluid conduits each having communication with one of the compartments of the various blades, means for supplying pressure fluid to said conduit, controlling means therefor having passages communicating respectively with said conduits, two valves respectively controlling said passages, means for simultaneously actuating said valves so that the one acts to admit pressure fluid to its particular conduit while the other relieves the other conduit.

4. In an adjustable propeller, the combination of a hub, blades pivotally carried thereby, means for admitting pressure fluid to said blades so as to turn them on their pivots, a flange on said blades, and a bi-partite nut under said flange, said hub being provided with a recess which is located between said nut and the root of the propeller and constitutes an annular chamber serving to relieve the fluid pressure.

In testimony whereof I have signed my name to this specification in the presence of two subscribing witnesses.

WILHELM SCHMID.

Witnesses:
    Toh. Heinrich Frey,
    A. Lieberknecht.